Patented Aug. 12, 1952

2,606,811

UNITED STATES PATENT OFFICE 2,606,811

HYDROGENATION OF SILICON COMPOUNDS

George H. Wagner, Kenmore, N. Y., assignor, by mesne assignments, to Union Carbide and Carbon Corporation, a corporation of New York No Drawing. Application October 10, 1947, Serial No. 779,201

4 Claims. (Cl. 23—14)

Compounds containing the Si—Si bond, for example $Si_2Cl_6$, $Si_2HCl_5$ and $Si_3Cl_8$ can be produced in various ways. While these products are useful in synthesizing other silicon compounds, they are in some cases less desirable than the substitution products of silane, such as $SiHCl_3$ and $SiH_2Cl_2$. I have found that hydrogenation affords a simple and effective means for breaking down the more complex molecules into molecules containing a single silicon atom.

Example I

In a particular case, 116 grams of $Si_2Cl_6$ was placed in a 300 cc. autoclave, and hydrogen was introduced at room temperature until the pressure reached 500 pounds per square inch. The reactor was then sealed and heated to 400° C. for two hours. The liquid product was fractionated and gave, by weight 5% $SiH_2Cl_2$, 64% $SiHCl_3$ and 31% of a mixture of $SiCl_4$ with $Si_2Cl_6$.

Example II $Si_2HCl_5$ (109 grams) was placed in a 300 cc. Monel vessel, and hydrogen was then introduced at room temperature to a pressure of 1,000 p. s. i. The reactor was sealed, and held at 400° C. for 2.5 hours. It was then cooled and opened, and the product was fractionated by distillation. The portion which was volatile at room temperature and 10 mm. pressure constituted 70%, and consisted of $SiHCl_3$ 61%, $SiH_2Cl_2$ 35% and $SiCl_4$ 4%.

Example III $Si_3Cl_8$ (95 grams) was hydrogenated under the same conditions as in Example II except that the initial hydrogen pressure was 750 p. s. i. and the time at 400° C. was 3 hours. The product contained 60% of material volatile at room temperature and 10 mm. pressure, and of this volatile portion $SiHCl_3$ constituted 68%, $SiH_2Cl_2$ 14%, and $SiCl_4$ 18%.

The hydrogenation also proceeds readily at temperatures at low as 300° C. The hydrogen pressure is not critical, and may be lower than in the example cited. Pressures of 500 p. s. i. or higher are preferred, however, as they favor a more complete decomposition of the two-silicon-atom molecules. Catalysts have not been found to be necessary, but in view of the facts that the hexachlorodisilane used was prepared in the presence of metals, and that the hydrogenation itself was carried out in a metal vessel unlikely to be completely proof against attack by the chlorinated substances, the presence of traces of metals capable of acting catalytically is not precluded. Accordingly, the invention is only restricted to the extent imposed by the appended claims.

What is claimed is:

1. Process of making a compound having a single silicon atom in the molecule which comprises heating a compound containing a halogen and the Si—Si bond to a temperature at least about 300° C. in the presence of hydrogen.

2. Process of making a compound having a singe silicon atom in the molecule which comprises heating a chlorinated derivative of disiline to a temperature at least about 300° C. in the presence of hydrogen.

3. Process of making a compound having a single silicon atom in the molecule which comprises heating a compound containing a halogen and the Si—Si bond to a temperature at least about 300° C. in the presence of hydrogen at a pressure of at least 500 pounds per square inch.

4. Process of making a compound having a single silicon atom in the molecule which comprises heating a chlorinated derivative of disilane to a temperature of at least about 300° C. in the presence of hydrogen at a pressure of at least 500 pounds per square inch.

GEORGE H. WAGNER.

REFERENCES CITED

The following references are of record in the file of this patent:

UNITED STATES PATENTS

| Number | Name | Date |
|---|---|---|
| 2,406,605 | Hurd | Aug. 27, 1946 |

OTHER REFERENCES

Rochow, Chemistry of the Silicones, John Wiley and Sons, N. Y., 1946; page 5.

Groggins, "Unit Processes in Organic Synthesis" McGraw-Hill Book Co., Inc., N. Y. and London, 1938, 2nd ed., pages 437–441.

Mellor, "Comprehensive Treatise on Inorganic and Theoretical Chemistry," Longmans, Green and Co., London, 1925, vol. VI, page 962.

Dolgov, Uspekhi Khimii 1, No. 5, pages 626-648 (1932).

Dolgov et al., Jour. General Chemistry U. S. S. R.) I, No. 1, pages 91-104 (1931).